United States Patent [19]

Sliger

[11] 4,068,680
[45] Jan. 17, 1978

[54] SELF-CONTAINED VENT VALVE UNIT AND SYSTEM UTILIZING THE SAME

[75] Inventor: Boyd P. Sliger, Concord, Tenn.

[73] Assignee: Robertshaw Controls Company, Richmond, Va.

[21] Appl. No.: 707,384

[22] Filed: July 21, 1976

[51] Int. Cl.$^2$ ............................................. F16K 17/04
[52] U.S. Cl. ............................... 137/512.1; 137/493.2; 137/512.2; 137/512.3; 137/519.5
[58] Field of Search ............... 137/493.2, 493.9, 512.1, 137/512.2, 512.3, 519.5; 220/203, 204

[56] References Cited

U.S. PATENT DOCUMENTS

| 112,611 | 3/1871 | Marsh | 137/493.2 |
|---|---|---|---|
| 120,519 | 10/1871 | Hibberd | 137/493.2 |
| 2,634,947 | 4/1953 | Gardner | 137/493.2 X |
| 2,677,939 | 5/1954 | Clute | 137/512.1 X |
| 2,960,996 | 11/1960 | Haselton | 137/512.2 X |
| 3,152,606 | 10/1964 | Vedder | 137/493.2 |

FOREIGN PATENT DOCUMENTS 515,231  11/1939  United Kingdom .............. 137/512.1

*Primary Examiner*—Robert G. Nilson
*Attorney, Agent, or Firm*—Candor, Candor & Tassone

[57] ABSTRACT

A self-contained vent valve unit for a liquid system wherein liquid is to substantially fill a cavity and thereafter be pressurized in the cavity, the valve unit having a first valve arrangement adapted to be disposed in fluid communication with the cavity for venting air from the cavity during low pressure filling of the cavity with the liquid. The first valve arrangement is adapted to automatically close upon the pressurization of the liquid in the cavity to a first certain value thereof. The valve unit has a second valve arrangement also adapted to be disposed in fluid communication with the cavity for venting the liquid from the cavity when the pressure of the liquid reaches a second certain value thereof.

6 Claims, 7 Drawing Figures

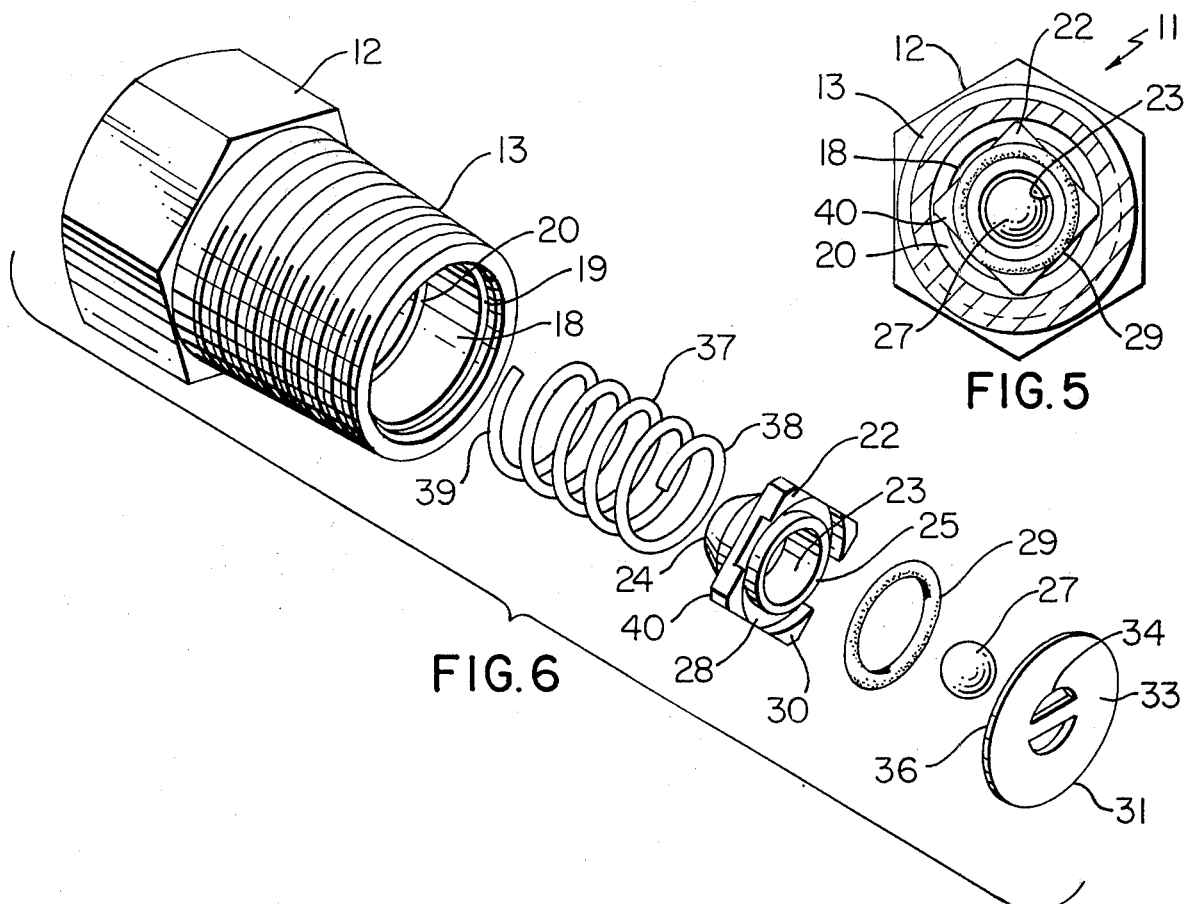
FIG.5
FIG.6
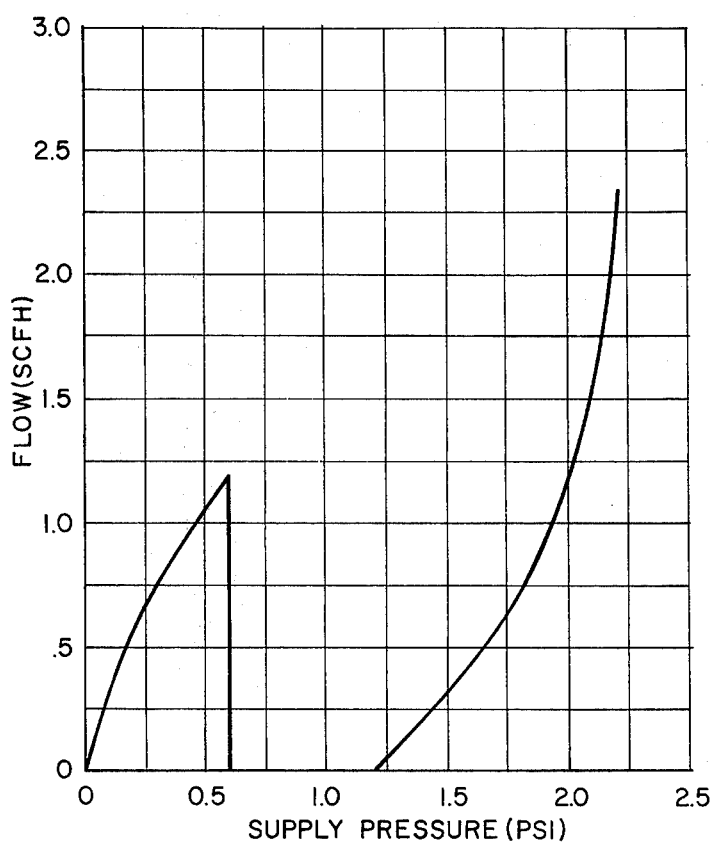
FIG.7

4,068,680

SELF-CONTAINED VENT VALVE UNIT AND SYSTEM UTILIZING THE SAME

This invention relates to a self-contained vent valve unit and to a liquid system utilizing the same.

It is well known that when a cavity of a liquid system is to be initially filled with a liquid, some means must be provided to vent the air being replaced by the liquid as the liquid is being filled therein. In such systems, the liquid is thereafter pressurized and some means must be provided to prevent the liquid from being pressurized above an unsafe value. For example, such a liquid system can comprise a liquid fill solar heat collector system or the like.

Accordingly, it is a feature of this invention to provide a self-contained valve unit for such a liquid system wherein the valve unit will perform the function of venting the air during the liquid filling of the system and will thereafter provide a safety relief or high pressure venting to prevent the pressure of the subsequently pressurized liquid in the system from exceeding a certain value.

In particular, one embodiment of this invention provides a self-contained valve unit for a liquid system wherein liquid is to substantially fill a cavity and thereafter be pressurized in the cavity, the self-contained valve unit having a first valve means adapted to be disposed in fluid communication with the cavity for venting air from the cavity during low pressure filling of the cavity with the liquid. The first valve means is adapted to automatically close upon the pressurization of the liquid in the cavity to a first certain value thereof. The valve unit has a second valve means adapted to be disposed in fluid communication with the cavity for venting the liquid from the cavity when the pressure of the liquid reaches a second certain value thereof.

Therefore, it is an object of this invention to provide a self-contained vent valve unit having one or more of the novel features set forth above or hereinafter shown or described.

Another object of this invention is to provide a liquid system utilizing such a vent valve unit.

Other objects, uses and advantages of this invention are apparent from a reading of this description which proceeds with reference to the accompanying drawings forming a part thereof and wherein:

FIG. 5 is a reduced, fragmentary, cross-sectional view taken on line 5—5 of FIG. 4.

FIG. 6 is an exploded perspective view of the various parts of the vent valve unit of FIG. 2.

FIG. 7 is a graph representing the flow through the vent valve unit of this invention for different pressures of the liquid in the system utilizing the vent valve unit of this invention.

Figure 1:
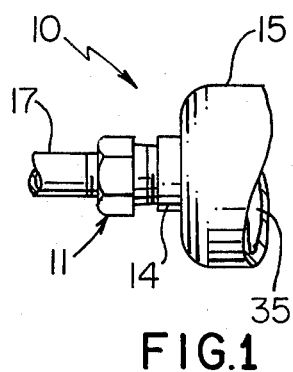
FIG. 1 is a fragmentary view illustrating the liquid system of this invention.

While the various features of this invention are hereinafter described and illustrated as being particularly adapted to provide a self-contained vent valve unit for a liquid system, it is to be understood that the various features of this invention can be utilized singly or in any combination thereof to provide a vent valve unit for other types of fluid as desired.

Therefore, this invention is not to be limited to only the embodiment illustrated in the drawings, because the drawings are merely utilized to illustrate one of the wide variety of uses of this invention.

Figure 2:
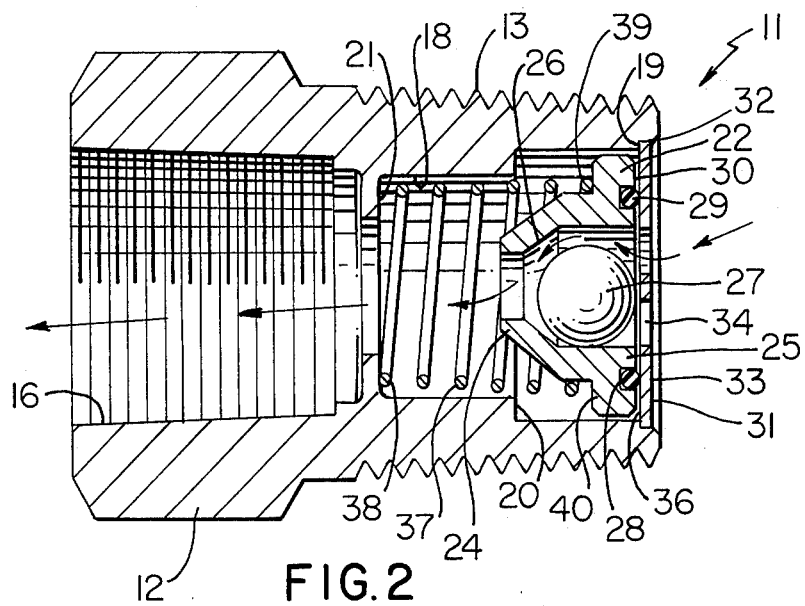
FIG. 2 is an enlarged cross-sectional view illustrating the self-contained vent valve unit of this invention that is utilized in the system of FIG. 1.

Referring now to FIG. 1, the improved liquid system of this invention is generally indicated by the reference number 10 and includes a self-contained vent valve unit of this invention that is generally indicated by the reference numeral 11 in FIGS. 1 and 2 and comprises a housing means 12 having an externally threaded end 13 for threading into a suitable coupling 14 of a liquid receiving cavity defining member 15 so as to be in fluid communication with a cavity 35 thereof as will be apparent hereinafter.

The housing 12 has an internally threaded end 16 for coupling to a vent pipe 17 leading to the atmosphere reservoir, or other structure as desired.

The housing 12 of the unit 11 has a stepped opening 18 passing through the opposed ends 13 and 16 thereof to not only define the internally threaded secction 16, but also to define three spaced and coaxially aligned internal shoulders 19, 20 and 21 of the housing means 12 as illustrated.

A movable part 22 is disposed in the opening 18 of the housing means 12 and has an opening 23 passing through opposed ends 24 and 25 thereof, the opening 23 at the end 24 defining a frusto-conical valve seat 26 that is adapted to be opened and closed by a ball valve member 27 disposed within the opening 23 of the movable part 22.

The end 25 of the movable part 22 is provided with an annular groove 28 being disposed concentric with the opening 23 and outboard of the same to receive an annular resilient member 29, such as an O-ring, which projects outwardly from the substantially flat face 30 of the end 25 of the movable part 22 as illustrated.

A plate or disc 31 is disposed in the opening 18 of the housing means 12 abuts against the internal shoulder 19 thereof whereby the plate 31 can be held against the shoulder 19 in any suitable manner, such as by inwardly turning of a part 32 of the housing means 12 over the outer face 33 of the plate 31.

The plate 31 has opening means 34 passing therethrough in such a manner that the opening means 34 are disposed inboard of the annular sealing member 29 of the movable part 22 while being in fluid communication with the cavity 35 of the cavity defining member 15 for a purpose hereinafter described.

Thus, it can be seen that when the part 22 is moved to the right in the housing means 12 to sealingly place annular member 29 thereof in sealing engagement against the side 36 of the plate 31, the annular member 29 performs a valve member function of closing the openings 34 in the plate 31 from the opening 18 in the housing means 12. However, the openings 34 are still disposed in fluid communication with the opening 23 of the movable part 22 for a purpose hereinafter described.

The part 22 is normally urged in a manner to seal against the surface 36 of the plate 31 by a compression spring 37 that is disposed within the opening 18 of the housing means 12 and has one end 38 bearing against the internal shoulder 21 and the other end 39 bearing against the part 22 to urge the same toward the plate 31 as illustrated.

The movable part 22 of the valve unit 11 has a substantially square flange 40 against which the end 39 of the spring 37 engages while the opening 18 in the housing 12 defines substantially cylindrical sections through the housing member 12 whereby the shoulders 19, 20 and 21 are substantially circular as will be apparent thereinafter.

From the above, it can be seen that the self-contained valve unit 11 of this invention can be formed from a relatively few parts to be self-contained as the plate 31 completely holds the spring 37, movable part 22 and ball valve member 27 within the housing means 12 whereby the housing means 12 can be threaded into the coupling 14 or be removed therefrom in a simple and effective manner to operate in a manner now to be described.

After the self-contained vent valve unit 11 of this invention is coupled into the system 10 of FIG. 1 by having the end 13 of the housing 12 threaded into the coupling 14 of the cavity defining member 15 and having the vent pipe 17 threaded into the threaded end 16 thereof as illustrated in FIG. 1, the liquid system 10 can have liquid fill the cavity 35 of the cavity defining member 15 by a gravity fill or the like so that as long as the liquid is filling the cavity 35 of the unit 15, air being replaced in the cavity 35 is adapted to escape out of the cavity 35 through the vent valve unit 11 as the same is in the condition illustrated in FIG. 2.

In particular, it can be seen in FIG. 2 that air is adapted to flow from the cavity 35 of the tank 15 through the openings 34 in the plate 31 and the opening 23 of the movable part 22 around the ball valve member 27 and out through the opening 18 to the vent pipe 17 because the ball 27 rests by gravity off of the valve seat 26 in view of the conical arrangement of the valve seat 26 and the fact that the unit 11 is disposed in the substantially horizontal position as illustrated.

Thus, even though the compression spring 37 is maintaining the second valve member 29 of the part 22 in sealing engagement against the valve seat plate 31 to prevent fluid communication between the openings 34 of the valve seat member 31 and the opening 18 of the housing means 12 external to the part 22, the ball valve member 27 has its valve seat 26 in an open condition to permit air venting during the normal low pressure liquid filling of the cavity 35 of the unit 15.

Figure 3:
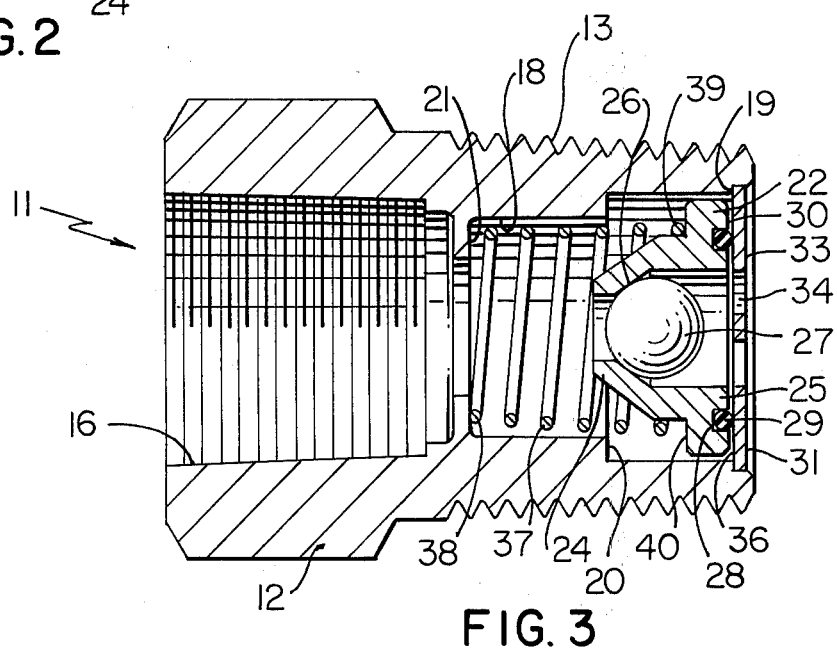
FIG. 3 is a view similar to FIG. 2 and illustrates the vent valve unit after the cavity of the liquid system has been filled with liquid.
Figure 4:
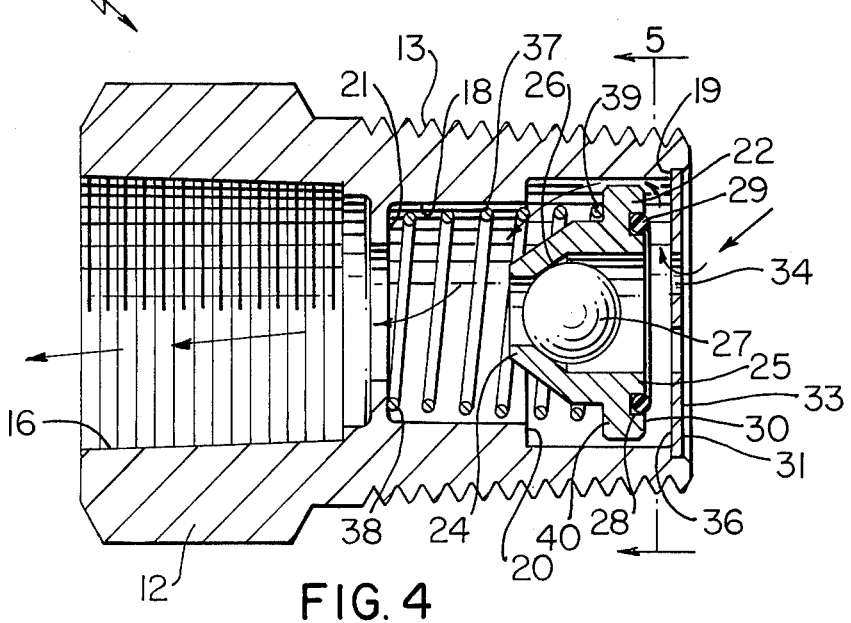
FIG. 4 is a view similar to FIG. 3 and illustrates the vent valve unit of this invention relieving excess liquid pressure in the system of FIG. 1.

However, once the cavity 35 of the unit 15 is substantially filled and the liquid in the cavity 35 is placed under pressure, the pressure differential now created across the ball 27 in the movable part 22 of the valve unit 11 is such that the same causes the ball valve member 27 to move to a closed condition against the seat 26 in the manner illustrated in FIG. 3 to completely seal closed the cavity 35 of the cavity defining unit 15 from the vent pipe 17 so that the liquid within the cavity 35 can be pressurized to the desired pressure and the ball 27 will remain in such closed condition against the valve seat 26 to prevent the escape of the pressurized liquid.

Should the pressure of the liquid in the cavity 35 of the cavity defining member 15 exceed a safe high value thereof, the force of the liquid acting through the openings 34 of the valve plate 31 against the movable part 22 of the valve unit 11 overcomes the force of the compression spring 37 to move the part 22 to the left in the drawings relative to the valve plate 31 and thereby open the valve member 29 away from the valve seat surface 36 of the plate 31 to permit the pressurized liquid to flow out around the part 22 into the opening 18 of the housing means 12 and, thus, out of the vent pipe 17 to relieve the excess pressure in the cavity 35 of the unit 15 as illustrated in FIG. 5.

In this manner, the movable part 22 will prevent the pressure in the unit 15 from exceeding a safe value thereof and when the pressure of the liquid in the unit 15 falls below the unsafe value thereof, the compression spring 37 returns the valve member 22 to its closed position illustrated in FIG. 3 and thereby prevents further loss of pressure through the vent valve unit 11.

However, should the pressure within the cavity 35 of the unit 15 continue to increase beyond the safe level thereof, the part 22 is further moved away from the valve seat surface 36 to allow a greater flow of liquid from the cavity 35 to the vent pipe 17 so that the pressure in the cavity 35 can never exceed a certain value.

In particular, reference is made to FIG. 7 wherein the graph thereof represents the pressure of the liquid in the cavity 35 on the X axis of the graph and the amount of flow through the vent valve unit 11 to the vent pipe 17 on the Y axis thereof, the graph of FIG. 7 merely illustrating one typical application of the vent valve unit 11 of this invention and not being a limitation thereon.

Accordingly, it can be seen that as the liquid supply has its pressure increased from approximately zero to 0.6 psi during the low pressure fill of the cavity 35, the ball valve 27 is in an open condition thereof to permit the air to escape from the cavity 35 of the unit 15 but once the pressure differential across the ball 27 exceeds substantially 0.6 psi, the pressure differential across the ball 27 is sufficient to seat the ball 27 against the valve seat 26 and thereby close off the cavity 35 from the vent pipe 17. The cavity 35 is completely sealed from the vent pipe 17 by the valve unit 11 of this invention as the pressure of the liquid in the cavity 35 thereof increases until approximately 1.25 psi at which time the part 22 is adapted to crack open the valve seat surface 36 to relieve the excess pressure in the cavity 35 above approximately 1.25 psi. Thus, the part 22 will further open relative to the plate 36 as the pressure of the liquid in the cavity 35 increases to such a value that the part 22 is fully opened and will prevent the pressure of the liquid in the cavity 35 from substantially exceeding approximately 2.25 psi as illustrated in FIG. 7.

In order to prevent the valve part 22 from being moved to the left in the drawings to a position to prevent fluid flow from the cavity 35 to the vent pipe 17, the rectangular flange 40 of the part 22 will engage against the stop shoulder 20 of the housing unit 12 and it can be seen from FIG. 5 that sufficient space is provided around the part 22 to the opening 18 beyond the shoulder 20 for full flow of liquid from the cavity 35 to the vent pipe 17, the seating of the flange 40 against the shoulder 20 of the housing 12 taking place well before the compression spring 37 is compressed to a solid condition thereof so that sufficient openings through the spring 37 are still provided beyond the shoulder 20 to the threaded end 16 thereof at the time the member 22 is stopped against the shoulder 20 of the housing 12 whereby complete fluid flow is provided by the unit 11 of this invention to prevent the pressure in the cavity 35 from exceeding the safe limit as represented by the graph of FIG. 7.

Thus, it can be seen that this invention not only provides a self-contained vent valve unit having a dual function, but also this invention provides an improved liquid system utilizing such a vent valve unit.

While the form of the invention now preferred has been illustrated and described as required by the Patent Statute, it is to be understood that other forms can be utilized and still fall within the scope of the appended claims.

What is claimed is:

1. In a liquid system wherein liquid is to substantially fill a cavity and thereafter be pressurized in said cavity and having a self-contained valve unit for said system that has a first valve means disposed in fluid communication with said cavity for venting air to a vent from said cavity during low pressure filling of said cavity with said liquid, said first valve means automatically closing upon the pressurization of said liquid in said cavity to a first certain value thereof, said valve unit having a second valve means disposed in fluid communication with said cavity for venting said liquid to said vent from said cavity when the pressure of said liquid reaches a second certain value thereof, said valve unit having a housing, said first valve means comprising a first valve seat carried by said housing and a first movable valve member for opening and closing said first valve seat, said second valve means comprising a second valve seat carried by said housing and a second movable valve member for opening and closing said second valve seat, said first valve seat and said second valve member being the same part that is movable relative to said housing, a spring being carried by said housing and is operatively associated with said part to tend to hold the same against said second valve seat to close said second valve seat, said housing having a stop for limiting opening movement of said part relative to said second valve seat, said part having opposed ends with an opening passing through said ends, one of said ends defining said first valve seat and the other of said ends defining said second valve member, the improvement wherein said stop comprises an annular shoulder of said housing that defines a circular opening that leads to said vent, said part being square in cross-section so as to provide flow paths along the sides thereof through said circular opening to said vent when the corners thereof are seated against said annular shoulder.

2. A system as set forth in claim 1 wherein said second valve member comprises an annular resilient member carried by said other end of said part and being concentric with and outboard of said opening at said other end of said part.

3. A system as set forth in claim 2 wherein said first valve member comprises a ball disposed within said opening between said ends of said part.

4. In a self-contained vent valve unit for a liquid system wherein liquid is to substantially fill a cavity and thereafter be pressurized in said cavity, said self-contained valve unit having a first valve means adapted to be disposed in fluid communication with said cavity for venting air to a vent from said cavity during low pressure filling of said cavity with said liquid, said first valve means being adapted to automatically close upon the pressurization of said liquid in said cavity to a first certain value thereof, said valve unit having a second valve means adapted to be disposed in fluid communication with said cavity for venting said liquid to said vent from said cavity when the pressure of said liquid reaches a second certain value thereof, said valve unit having a housing, said first valve means comprising a first valve seat carried by said housing and a first movable valve member for opening and closing said first valve seat, said second valve means comprising a second valve seat carried by said housing and a second movable valve member for opening and closing said second valve seat, said first valve seat and said second valve member being the same part that is movable relative to said housing, a spring being carried by said housing and being operatively associated with said part to tend to hold the same against said second valve seat to close said second valve seat, seat housing having a stop for limiting opening movement of said part relative to said second valve seat, said part having opposed ends with an opening passing through said ends, one of said ends defining said first valve seat and the other of said ends defining said second valve member, the improvement wherein said stop comprises an annular shoulder of said housing that defines a circular opening that leads to said vent, said part being square in cross section so as to provide flow paths along the sides thereof through said circular opening to said vent when the corners thereof are seated against said annular shoulder.

5. A valve unit as set forth in claim 4 wherein said second valve member comprises an annular resilient member carried by said other end of said part and being concentric with and outboard of said opening at said other end of said part.

6. A valve unit as set forth in claim 5 wherein said first valve member comprises a ball disposed within said opening between said ends of said part.

* * * * *